United States Patent [19]

Kitamura

[11] Patent Number: 4,564,870
[45] Date of Patent: Jan. 14, 1986

[54] SIGNAL DETECTOR OF MAGNETIC DISK APPARATUS

[75] Inventor: Shunji Kitamura, Hanno, Japan

[73] Assignee: Tokyo Shibaura Denki Kabushiki Kaisha, Kawasaki, Japan

[21] Appl. No.: 535,163

[22] Filed: Sep. 23, 1983

[30] Foreign Application Priority Data

Sep. 28, 1982 [JP] Japan ................... 57-168853

[51] Int. Cl.⁴ ..................... G11B 5/09; G11B 5/02
[52] U.S. Cl. ........................... 360/51; 360/46; 360/67
[58] Field of Search ............. 375/27, 34; 360/46, 360/51, 67

[56] References Cited

U.S. PATENT DOCUMENTS

| | | | |
|---|---|---|---|
| 3,631,263 | 12/1971 | Graham et al. | 307/231 |
| 4,306,194 | 12/1981 | Chapman | 328/150 |
| 4,346,411 | 8/1982 | Buhler et al. | 360/67 |
| 4,376,958 | 3/1983 | Perrigrew | 360/51 |
| 4,399,474 | 8/1983 | Coleman, Jr. | 360/67 |
| 4,424,536 | 1/1984 | Hashimoro et al. | 360/51 |

Primary Examiner—Vincent P. Canney
Attorney, Agent, or Firm—Cushman, Darby and Cushman

[57] ABSTRACT

A signal detector of a magnetic disk apparatus has a comparator for generating a pulse signal when an analog signal from a magnetic head for performing the read/write operation of data falls within a range between predetermined voltage levels, a flip-flop for receiving an output signal from the comparator and for generating the signal required in converting a peak of the analog signal to a digital signal, in accordance with the output signal from the comparator, and a gate circuit for supplying a clock pulse to the flip-flop, said clock pulse corresponding to the zero-crossing point of the differential signal for detecting the peak of the analog signal and having a predetermined pulse width, in response to the output signal from the comparator.

9 Claims, 25 Drawing Figures

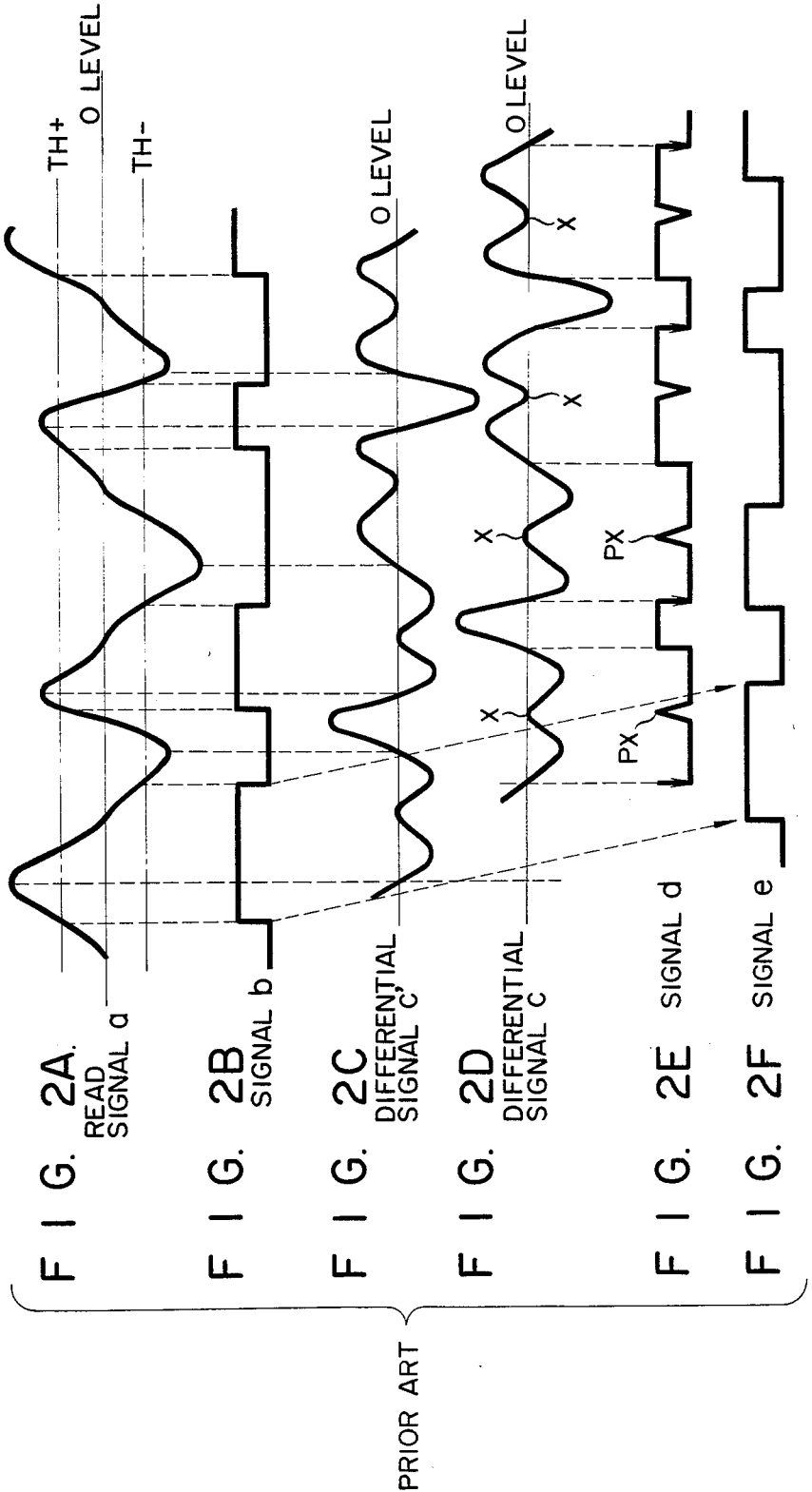

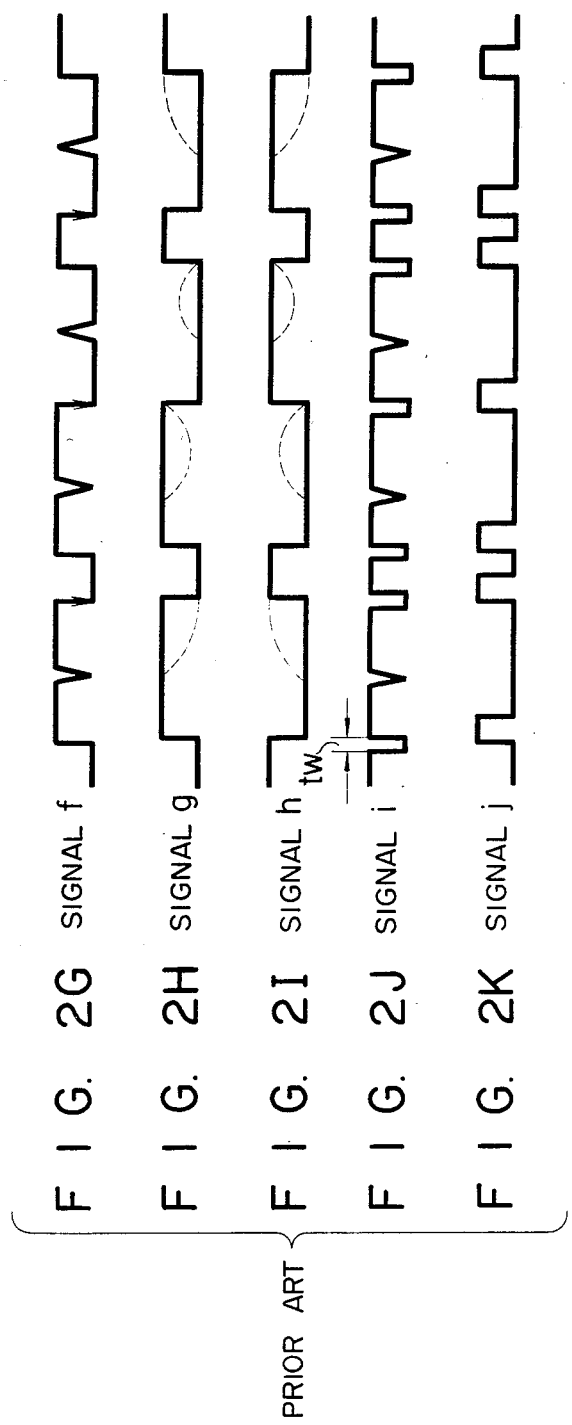

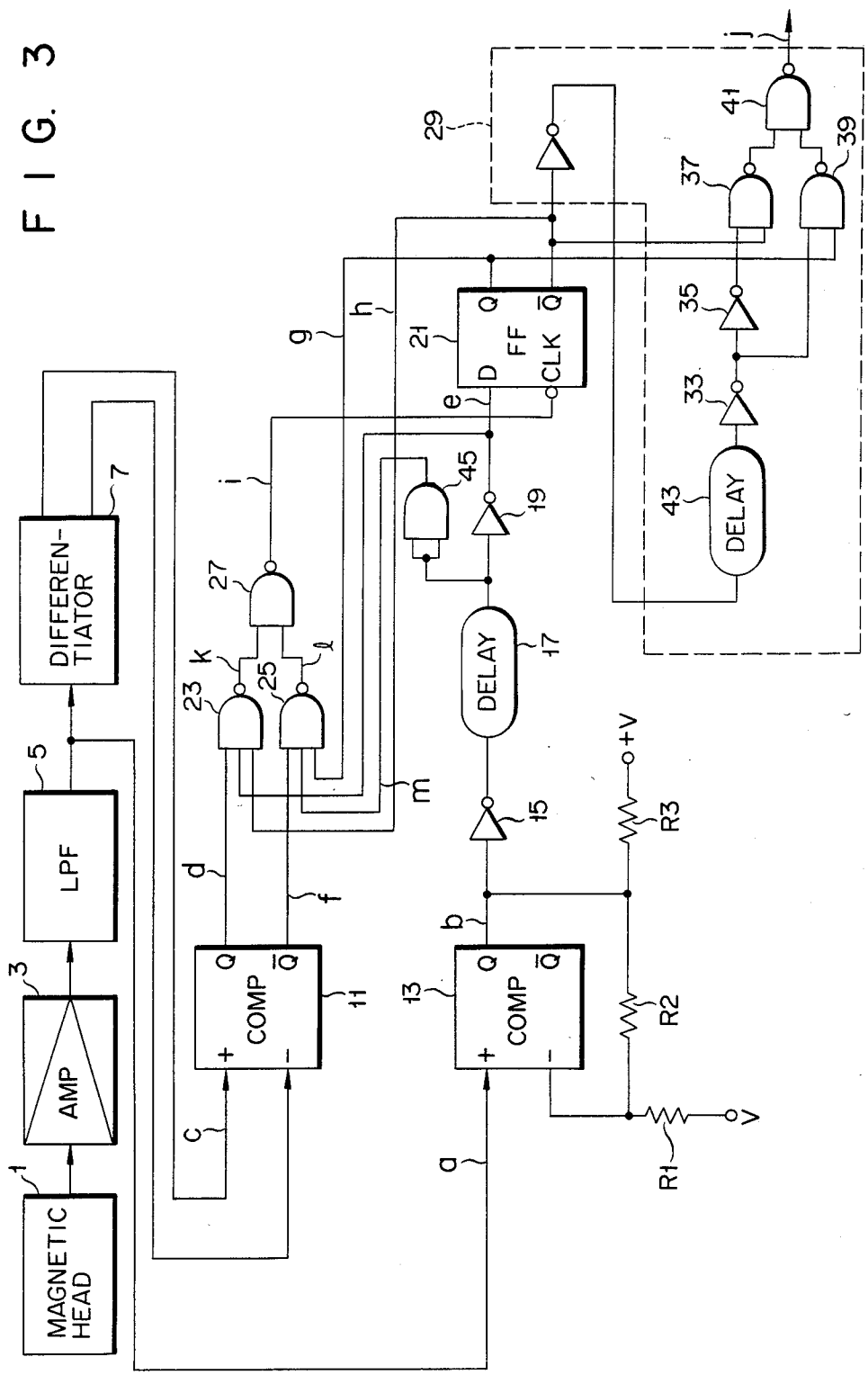
F I G. 3

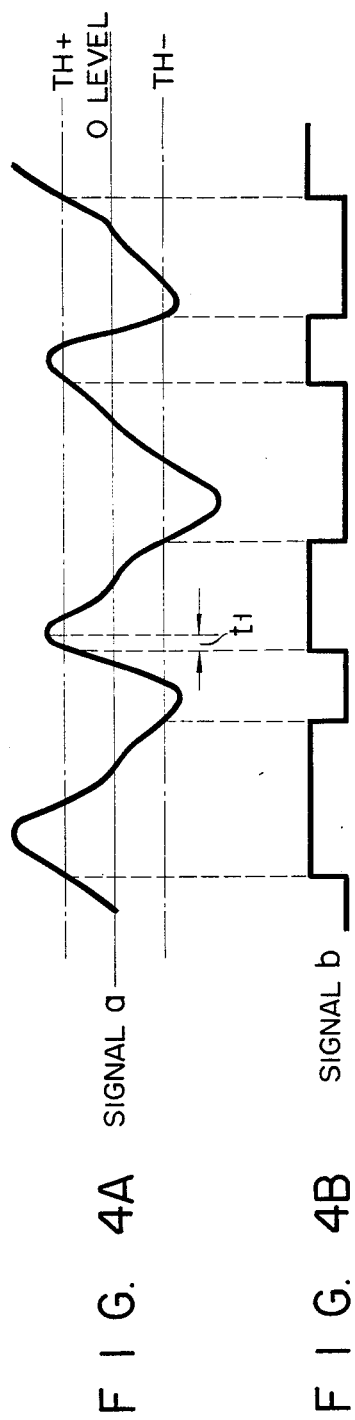

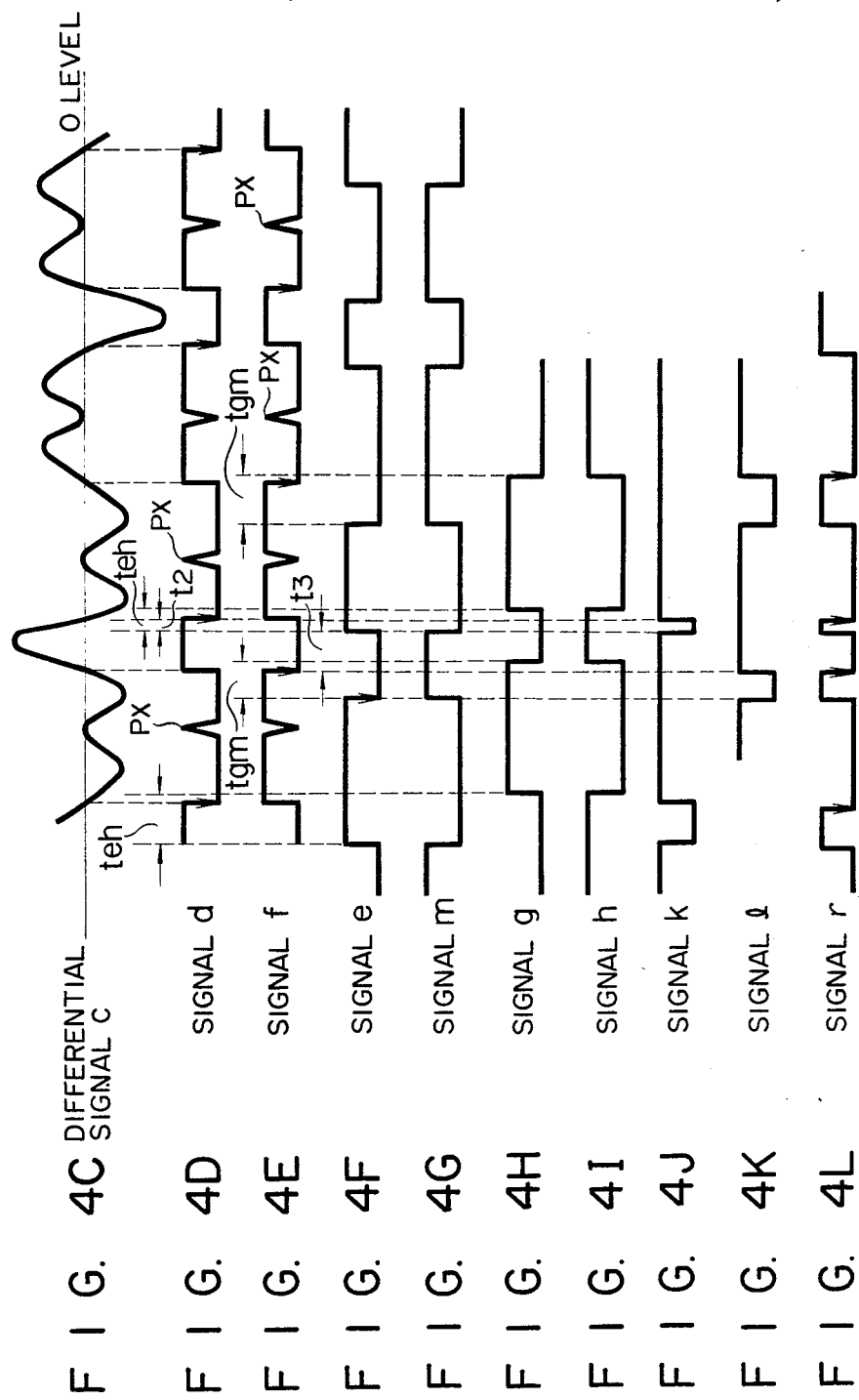

SIGNAL DETECTOR OF MAGNETIC DISK APPARATUS

BACKGROUND OF THE INVENTION

The present invention relates to a pulse circuit of a magnetic disk apparatus, which converts a peak position of a read signal from a magnetic head to a pulse signal serving as a digital signal.

In general, the data read operation in a magnetic disk apparatus is performed by a readout circuit which includes a pulse circuit. FIG. 1 illustrates a typical readout circuit. Data recorded on a magnetic disk is detected by a magnetic head 1 and is produced as a read signal (head reproduction signal) of an analog signal (voltage signal). The read signal is then amplified by a pre-amp 3, and head noise, ambient noise and circuit noise of the amplified read signal are removed by a low-pass filter (LPF) 5. The filtered signal is differentiated by a differentiator 7. The differential signal is then quantized by a signal detector. Finally, the quantized (or digital) signal is supplied as read data to a controller of the magnetic disk apparatus.

The signal detector (mentioned above) is used to convert a peak position of the read signal to a pulse signal (which serves as a digital signal) and as such is essential to the stable reading of data. In the typical signal detector, an analog signal (differential signal) c obtained by differentiating the read signal is supplied to one input terminal of a comparator 11. A signal having a phase opposite to that of the differential signal c is supplied to the other input terminal thereof. A signal a, having a phase opposite to that of the read signal, is applied to comparator 13. the comparator 13 generates a pulse signal b which rises when the read signal a exceeds a predetermined voltage level TH+ and which falls when the read signal a is less than the predetermined voltage level TH−.

The pulse signal b is supplied to a delay line 17 through an inverter 15 and is delayed by the delay line 17 for a predetermined delay time. This delayed signal is inverted by an inverter 19, which produces a signal e. The signal e is supplied to a data input terminal D of a D-type flip-flop 21. In FIG. 1, reference numerals R1, R2 and R3 denote resistors and reference symbols +V and −V denote voltages.

The comparator 11 produces pulse signals d and f, which rise and fall in response to a zero-crossing of the differential signal c, as shown in FIGS. 2E and 2G, respectively. Pulse signal f is an inverted signal of pulse signal d. The differential signal c is obtained by delaying, for a given delay time, an analog signal c' (see FIG. 2C) which has zero-crossing points respectively corresponding to the positive and negative peaks of the read signal a, thus representing the differentiated read signal. Pulse signal d is supplied to one input terminal of NAND gate 23, and pulse signal f is supplied to one input terminal of NAND gate 25. An output ($\overline{Q}$ output of FIG. 2I) signal h from the flip-flop 21 is supplied to the other input terminal of NAND gate 23, and an output (Q output of FIG. 2H) signal g from the flip-flop 21 is supplied to the other input terminal of NAND gate 25. The output signals from NAND gates 23 and 25 are supplied to NAND gate 27.

An output signal i (FIG. 2J) from NAND gate 27 is supplied as a clock signal to a clock input terminal CLK of the flip-flop 21. The flip-flop 21 supplies output signals g and h (also discussed above) to a logic circuit 29 (FIG. 1) in synchronism with the clock signal i. The logic circuit 29 generates a pulse signal j having the waveform shown in FIG. 2K (i.e., the digital signal representing the zero-crossing points of the differential signal c which correspond to the peaks of the read signal a). The pulse signal j is regarded as the abovementioned read data. The logic circuit 29 is constituted by inverters 31, 33 and 35, NAND gates 37, 39 and 41, a delay line 43, and so on.

The pulse circuit having the configuration described above produces a conversion of the read data from the magnetic head to a digital signal. However, according to the conventional system described above, unnecessary zero-crossing points x occur in the differential signal c, as shown in FIG. 2D. Unnecessary pulse signals Px occur in the output signals d, f from the comparator 11. For this reason, a pulse signal i having an insufficient pulse width is often supplied, as the clock signal, to the flip-flop 21. Subsequently, a race condition occurs in the flip-flop 21, and output signals g and h become unstable. These unstable signals increase the error rate and degrade reliability of the magnetic disk apparatus.

SUMMARY OF THE INVENTION

A primary object of the present invention is to provide a signal detector for the readout circuit of a magnetic disk apparatus, wherein the peak of a read signal read out from a magnetic head is properly converted to a pulse signal serving as a digital signal, to accurately produce read data and, hence, to improve reliability of the magnetic disk apparatus.

To achieve the above object, a signal detector of a magnetic disk apparatus is provided, which has a magnetic head for performing the data read/write operation and a differentiator circuit for differentiating an analog signal read out from said magnetic head; said signal detector comprising:

means, coupled to said differentiator circuit, for detecting a ramp state of the waveform of an output from the magnetic head and the zero-crossing point of the output therefrom;

data generating means for generating a signal corresponding to a true peak of the output from the magnetic head;

gate enable signal generating means, coupled to the output from the magnetic head, for generating a signal enabling the detecting means to supply an output to the data generating means; and gate disable signal generating means for prohibiting the output from the detecting means from being supplied to the data generating means, in accordance with the output from the gate enable signal generating means and the output from the data generating means;

the data generating means being coupled to said detecting means, said gate enable signal generating means and said gate disable signal generating means.

BRIEF DESCRIPTION OF THE DRAWINGS

Other objects and features of the present invention will be apparent from the following description, in conjunction with the accompanying drawings, in which:

FIGS. 2A through 2K are timing charts of various signals of the pulse circuit shown in FIG. 1, in which FIG. 2A shows a read signal a from the magnetic head, FIG. 2B shows a signal b obtained by pulse-shaping the read signal a at a predetermined threshold value, FIG. 2C shows an analog signal c' having zero-crossing points corresponding to the peaks of the read signal a, FIG. 2D shows a differential signal c, FIG. 2E shows a pulse signal d which rises in response to the zero-crossing point of the differential signal c, FIG. 2F shows an inverted signal e obtained by inverting the delayed signal from a delay line 17 by means of an inverter 19, FIG. 2G shows a pulse signal f which falls in response to the zero-crossing point of the differential signal c, FIG. 2H shows a Q output signal g from a flip-flop 21, FIG. 2I shows a $\bar{Q}$ output signal h from the flip-flop 21, FIG. 2J shows a clock signal i from NAND gate 27, and FIG. 2K shows a read data signal j;

FIG. 3 is a circuit diagram illustrating a pulse circuit of a magnetic disk apparatus according to an embodiment of the present invention; and FIGS. 4A through 4L are timing charts of various signals of the pulse circuit shown in FIG. 3, in which FIG. 4A shows a read signal a from a magnetic head, FIG. 4B shows a signal b obtained by pulse-shaping the read signal a at a predetermined threshold value, FIG. 4C shows a differential signal c, FIG. 4D shows a pulse signal d which rises in response to a zero-crossing point of the differential signal c, FIG. 4E shows a pulse signal f which falls in response to the zero-crossing point of the differential signal c, FIG. 4F shows an inverted signal e obtained by inverting a delayed signal from a delay line 17 by means of the inverter 19, FIG. 4G shows a signal m obtained by gating the delayed signal from the delay line through an AND gate, FIG. 4H shows a Q output signal g from the flip-flop 21, FIG. 4I shows a $\bar{Q}$ output signal h from the flip-flop 21, FIG. 4J shows an output signal k from NAND gate 23, FIG. 4K shows an output signal l from NAND gate 25, and FIG. 4L shows a clock signal i from NAND gate 27.

DETAILED DESCRIPTION OF THE PREFERRED EMBODIMENT

Figure 1:
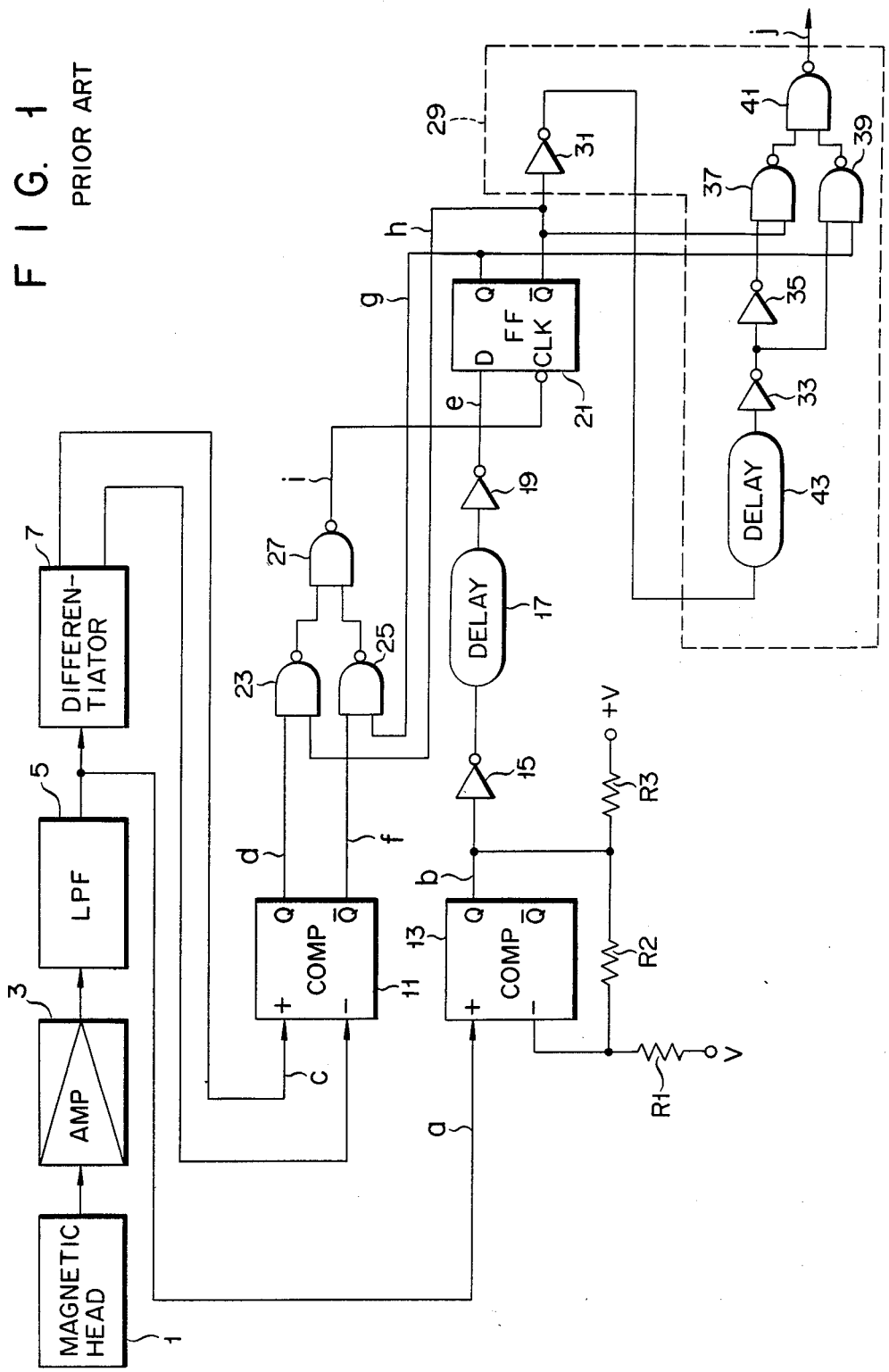
FIG. 1 is a circuit diagram illustrating a pulse circuit of a conventional magnetic disk apparatus.

FIG. 3 is a circuit diagram of the signal detector of a magnetic disk apparatus according to an embodiment of the present invention. For ease of understanding, the numerals used to specify the components of the prior art in FIG. 1 denote the identical or corresponding parts in FIG. 3.

Referring to FIG. 3, in accordance with the present invention, an output signal from a delay line 17 is supplied to an AND gate 45. This output signal m from the AND gate 45 is synchronized with an output signal e from an inverter 19, signal e being formed from the same source as signal m and both having undergone one gate delay.

An output signal b from comparator 13 feeds the delay line 17 through an inverter 15. A NAND gate 25 receives an output signal f from comparator 11, an output signal g from the flip-flop 21 and signal m (previously described). According to the present invention, the output signal e from the inverter 19 which is synchronized with signal m, is supplied to the "D" input of flip flop 21 and to a NAND gate 23. The NAND gate 23 receives a Q output signal d from the comparator 11, a $\bar{Q}$ output signal h from the flip-flop 21, and signal e.

The operation of the signal detector having the configuration described above will be described with reference to FIGS. 4A through 4L. The read signal (analog voltage signal) a is produced by the magnetic head 1 and is supplied to the comparator 13 through a pre-amp 3 and an LPF 5. The comparator 13 generates the pulse signal b (FIG. 4B) which rises when the read signal a (FIG. 4A) exceeds a predetermined voltage level TH+ and which falls when the read signal a is less than a predetermined voltage level TH−. The pulse signal b is inverted by the inverter 15 and is delayed by the delay line 17 for a predetermined delay time. This scenario of events is similar to the prior art.

In accordance with the invention, the delayed signal is also supplied to an AND gate 45 and inverter 19. The inverted output signal e from the inverter 19 is supplied to the data input terminal D of the D flip-flop 21 and to NAND gate 23.

The read signal a from the magnetic head 1 is supplied as the differential signal c to the comparator 11, through the pre-amp 3, the LPF 5 and the differentiator 7. As a result, the comparator 11 generates pulse signals d (FIG. 4D) and f (FIG. 4E), which rise and fall in response to the zero-crossing point of the differential signal c, respectively. Pulse signal f is an inverted signal of pulse signal d. The differential signal c is an analog signal having zero-crossing points at the positive and negative peaks of the read signal a and is delayed for a predetermined time.

The differential signal c approaches the zero-crossing points when the slope of the read signal a comes close to zero. Because the zero-crossing points indicate the peaks of the read signal a, the comparator 11 outputs an undesirable (and incorrect) pulse, PX, at those points. Naturally, the pulse signals d, f containing the pulse PX (as shown in FIGS. 4D and 4E) are respectively supplied to the NAND gates 23, 25.

When pulse signals d and f are set at logic levels "1" and "0", respectively, signals m and e are set at logic levels "0" and "1", respectively, and signals g and h are set at logic levels "0" and "1", respectively. The output signal k from NAND gate 23 will then assume a logic level "0". Therefore, the output signal from NAND gate 27 will be forced to logic level "1", irrespective of the logic level of the output signal l from NAND gate 25. This state occurs at, for example, time interval t2 of FIGS. 4D–4J.

Next, assume that pulse signals d and f go to logic levels "0" and "1", respectively; that the flip-flop 21 receives signal e, in response to signal r (which corresponds to signal i of the prior art); and thus output signals g and h go to logic levels "1" and "0", respectively. Under such conditions, when signals e and m are set at logic levels "1" and "0", as shown in FIGS. 4F and 4G, respectively, the output signals k, l shown in FIGS. 4K and 4J (from NAND gates 23 and 25) will both assume the logic level "1" state. Therefore, the output signal r from NAND gate 27 is set at logic level "0", as shown in FIG. 4L. In this case, even if pulse signals d and f should assume logic levels "1" and "0", due to the undesirable pulses Px, the output signals k, l from the NAND gates are kept at logic level "1".

As is clear from FIGS. 4D through 4I, only when signal d falls within the window $t_{eh}$ of a signal obtained by ANDing signals e and h, is it detected that signal d truly falls. Similarly, only when signal f falls within the window $t_{gm}$ of a signal obtained by ANDing signals g and m, is it detected that signal f truly falls.

As shown in FIG. 4D, even if jitter Px occurs in signal d during a period excluding window $t_{eh}$, the logic level of signal r will not change. Similarly, as shown in FIG. 4E, even if jitter Px occurs in signal f during a period excluding window $t_{gm}$, the logic level of signal i will not change. This means that the signal r shows only the peaks of the read signal a. Accordingly, unlike the above-discussed prior art, the flip-flop 21 has no race condition.

When the signal r (on which solely the peaks of the read signal a appear accurately) alone is used as a clock for the flip-flop 21, prevention of the race condition requires that the pulse width of the signal r be wider than a specific value tw. Such a width may be attained by selecting the time to be delayed by the delay line 17. The pulse width t2 shown in FIGS. 4D and E is controlled in the following manner:

$$t2 > t1 + tw,$$

where t1 is the time interval between the moment when the threshold level (TH+) of the comparator 13 crosses the read signal a and the moment when the threshold level has reached the peak of the read signal a; tW being the pulse width required for the flip-flop 21. Pulse width tW is shorter than pulse width t3.

What is claimed is:

1. A signal detector for a magnetic disk apparatus having a magnetic head for reading/writing data and a differentiator circuit for differentiating an analog signal produced by said magnetic head, comprising:
    zero crossing means, coupled to said differentiator circuit, for detecting the zero-crossing point of the output of said differentiator circuit;
    peak detecting means, coupled to said differentiator circuit, for generating a signal representing the peaks of the output signal from said magnetic head;
    gate enable signal generating means, coupled to said output from said magnetic head, for generating a signal enabling said zero crossing means to supply an output to said peak detecting means based on said output signal from said magnetic head; and
    gate disable signal generating means for prohibiting the output from said zero crossing means from being supplied to said data generating means, based on the output from said gate enable signal generating means and the output from said means;
    said peak detecting means being coupled to said zero detecting means, said gate enable signal generating means and said gate disable signal generating means.

2. A detector according to claim 1, wherein said gate enable signal generating means comprises a comparator for generating a pulse signal when the analog signal from said magnetic head falls within a range between predetermined threshold values.

3. A detector according to claim 2, wherein said peak detecting means comprises a gate circuit coupled to said differentiator circuit, said gate circuit being adapted to supply a clock pulse corresponding to the zero-crossing point of the differential signal from said differentiator circuit, said clock pulse having a predetermined pulse width corresponding to an output pulse signal from said comparator.

4. A detector according to claim 3, wherein said gated disable signal generating means comprises a latch circuit coupled to an output from said gate circuit, said latch circuit being adapted to latch the output from said comparator in response to the clock signal from said gate circuit.

5. A signal detector for a magnetic disk apparatus having a magnetic head for accessing a recording medium for data read out/writing, an amplifier circuit for amplifying a reproduced signal from said magnetic head and a low-pass filter circuit for eliminating high-frequency noise, said signal detector capable of detecting a peak of the reproduced signal from said magnetic head, comprising:
    differentiation circuit means for differentiating said reproduced signal and producing an output signal indicative thereof;
    cross-point detecting circuit means for receiving said output signal from said differentiation circuit means and detecting a zero-crossing point of said output signal;
    enable signal generating circuit means for receiving said reproduced signal and for generating an output signal based on said reproduced signal to enable a signal detection;
    inhibit signal generating circuit means for receiving said output signal of said enable signal generating circuit means and for generating an output signal to inhibit signal detection; and
    data detecting circuit means for receiving said output signal of said cross point detecting circuit means, said output signal of said enable signal generating circuit means and said output signal of said inhibit signal generating circuit means, and for performing a logical operation on said inputs of said data detecting circuit means, thereby detecting a signal corresponding to a peak of said reproduced signal.

6. A signal detector for a magnetic disk apparatus having a magnetic head, amplifier and filter which converts the peak position of the read signal of said magnetic disk apparatus to a digital pulse, comprising:
    differentiation means for differentiating said read signal, thus producing an analog differential signal with zero amplitude when said read signal has a zero slope;
    zero detecting means for detecting the zero amplitude occurrences of said differential signal and producing a signal indicative thereof;
    comparator means, coupled to said filtered read signal, for assuming two logic states, and for changing logic state when said read signal passes a predetermined threshold;
    clockable latch means for latching said logic signal from said comparator means, when said latch is clocked by said indicative signal from said zero detecting means; and
    inhibiting means for inhibiting said said latch from being clocked if a peak of said read signal has not occurred.

7. A signal detector as in claim 6 further comprising delay means for delaying said logic states from said comparator means for a predetermined period.

8. A signal detector as in claim 8 wherein said inhibiting means further comprises:
    gate means for gating said indicative signal from said zero crossing means with a signal representing the validity of said indicative signal.

9. A detector as in claim 8 wherein said latch means is a D-type flip-flop.